W. & L. E. GURLEY.
Telescope Attachment for Surveyor's Compass.
No. 205,742. Patented July 9, 1878.
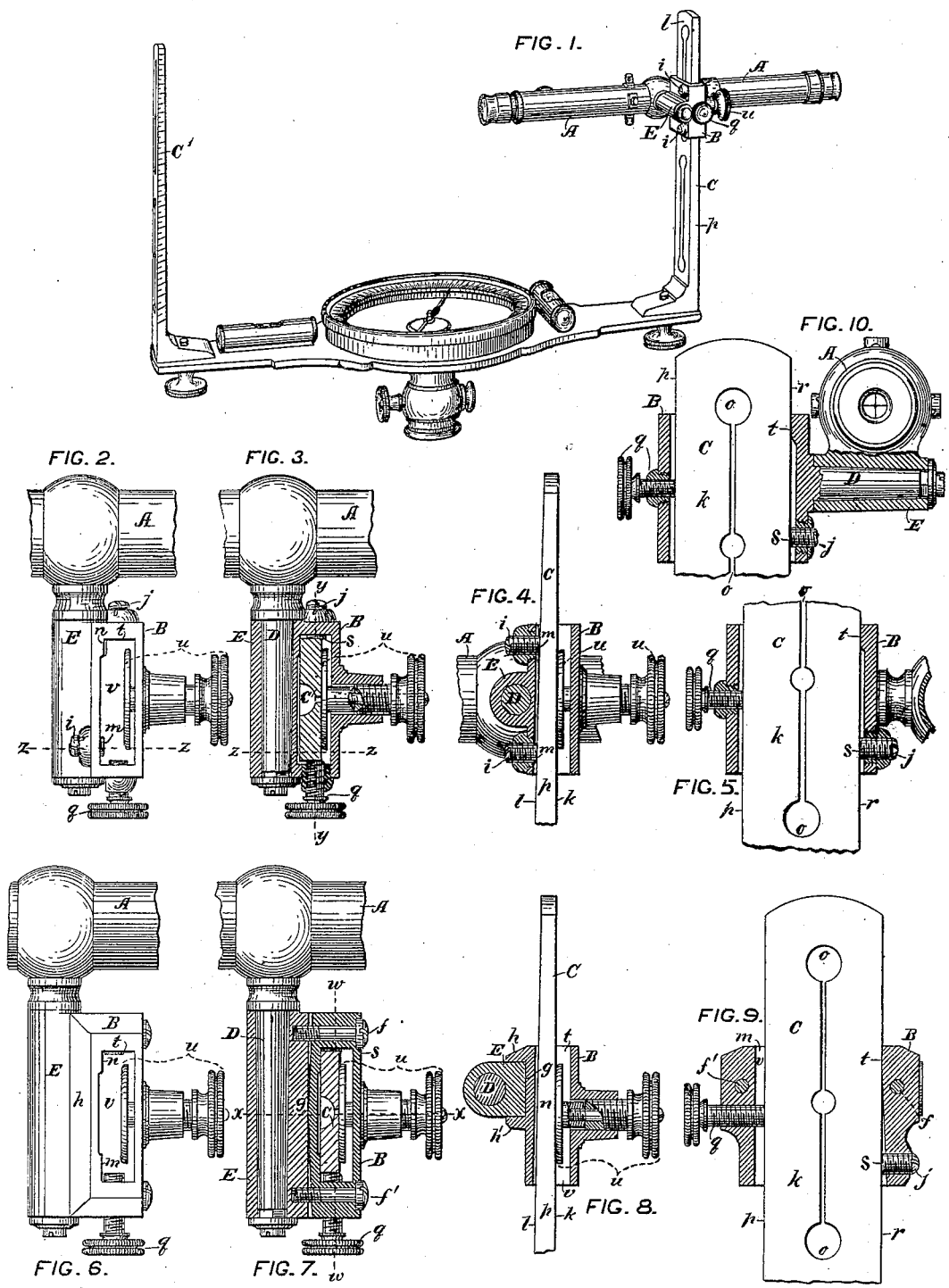
WITNESSES:
Paul Cook
F. C. A. Jones
INVENTORS:
William Gurley
Lewis E. Gurley

UNITED STATES PATENT OFFICE.

WILLIAM GURLEY AND LEWIS E. GURLEY, OF TROY, NEW YORK.

IMPROVEMENT IN TELESCOPE ATTACHMENTS FOR SURVEYORS' COMPASSES.

Specification forming part of Letters Patent No. 205,742, dated July 9, 1878; application filed June 18, 1878.

*To all whom it may concern:*

Be it known that we, WILLIAM GURLEY and LEWIS E. GURLEY, each of the city of Troy, in the county of Rensselaer and State of New York, have jointly invented a new and useful Telescopic Attachment for Surveyors' Compasses and Plane-Tables, of which the following is a specification, reference being had to the accompanying drawing.

One principal object of this invention is to produce a telescopic attachment which can be temporarily secured to one of the ordinary upright sight-vanes of a surveyor's compass or plane-table, so that, while the sight-vanes can be used in the ordinary manner, the telescope can also be used in a plane essentially parallel and very near to that of the sight-vanes, and with much greater accuracy and ease than the latter in taking long fore and back sights up and down steep hill-sides, as well as on level ground.

That object is accomplished by one part of our invention, which consists of a telescope having a supporting axis and attaching device, by which the telescope can be temporarily mounted on one of the ordinary upright sight-vanes of a surveyor's compass or plane-table without very materially obstructing the sight-vanes, and so that the telescope can be turned about the supporting-axis, with the optical axis of the telescope in a plane essentially parallel to the plane of sight of the sight-vanes.

A further part of this invention consists of a telescope having a supporting-axis and attachment furnished with adjusting devices, by which the telescope can be mounted on one of the ordinary upright sight-vanes of a surveyor's compass or plane-table, and readily adjusted thereon to turn about the said supporting-axis as a center, and with the optical axis of the telescope in a plane essentially parallel to the plane of sight of the sight-vanes, although the different sight-vanes on which the telescope can be thus mounted shall differ somewhat in size, shape, and inclination of surface.

In the aforesaid drawing, Figure 1 is a perspective view of a surveyor's compass having ordinary upright sight-vanes, upon one of which is mounted one form of our telescopic attachment. Fig. 2 is a full-size plan of the same attachment, the telescope being mostly broken away; and Fig. 3 is a partial plan and horizontal section, Fig. 4 a partial elevation and vertical section at the line $z\,z$, Fig. 2, and Fig. 5 a partial elevation and vertical section at the line $y\,y$, all of a portion of the same attachment applied to a part of one of the ordinary sight-vanes of a surveyor's compass or plane-table. Fig. 6 is a full-size plan of a modified form of our said telescopic attachment, the telescope being mostly broken away; and Fig. 7 is a partial plan and horizontal section, Fig. 8 a partial elevation and vertical section at the line $x\,x$ in Fig. 7, and Fig. 9 an elevation of a vertical section at the line $w\,w$, all of a portion of the same attachment mounted on the upper part of a sight-vane of a surveyor's compass. Fig. 10 is a sectional elevation of another modification of our telescopic attachment secured to the sight-vane of a surveying-instrument.

A is a telescope having cross-wires therein and adjustments essentially the same as the telescopes of ordinary transit-compasses or surveyors' transits. B is a stock or attachment having in or through it an opening, $v$, adapted to admit therein one of the two ordinary upright sight-vanes C C' of a surveyor's compass or plane-table, and the stock B is furnished with a clamp-screw, $u$, for securing the same upon the sight-vane.

The telescope is connected to the stock B by means of a supporting spindle or axis, D, fitted and secured in a corresponding socket, E, arranged so that the telescope can be turned about that axis as a center, and the cross-wires in the telescope are adjusted or adjustable in the ordinary way, so that the optical axis of the telescope is or can be made to turn in a plane at right angles to the said supporting-axis as the telescope is turned about that axis.

The axis D is fast on or firmly secured to the telescope A when the socket E is formed in one piece with or firmly secured to the stock B, as represented in Figs. 3 and 7, and that axis is fast on or secured firmly to the stock B when the socket E is fast on or firmly secured to the telescope, as shown in Fig. 10.

The stock B has two internal lugs, projections, or bearings, $t\ s$, arranged to fit against one edge, $r$, of the sight-vane C, and also a clamp-screw, $q$, arranged to screw against the opposite edge $p$ of the sight-vane, and thereby hold the internal bearings $t\ s$ tight against the edge $r$.

By properly filing one or the other of the bearings $t\ s$ the stock B is or can be adjusted so that the axis D is or shall be at right angles to the sight-line $o\ o$ of the sight-vane to which the stock B is or shall be secured.

The stock B also has other internal lugs, bearings, or projections, $n\ m$, arranged to fit against the side $l$ of the sight-vane when the clamp-screw $u$ is tightened against the other side $k$, as shown in Figs. 1, 3, 4, and 7.

By properly filing one or more of the bearings $n\ m$ the stock B is or can be adjusted so that the axis D is or shall be at right angles to the plane of sight of the two sight-vanes of the compass when that axis is first adjusted at right angles to the sight-line $o\ o$ of the one vane C, to which the stock is attached.

We generally prefer, however, to make some of the said internal lugs or bearings $t\ s\ n\ m$ on the stock B in the form of screws $j\ i$, extending tightly through the casing of the stock, essentially as represented in Figs. 4, 5, 9, and 10, and having at their outer ends slots or pin-holes, so that, by means of a screw-driver or adjusting-pin, the screws $j\ i$ can be turned in and out, and thereby set so as to adjust the stock, so that the axis D shall be at right angles to the plane of sight of the two sight-vanes C C' on the compass, without requiring any of the internal bearings $t\ s\ n\ m$ to be filed in making such adjustment.

In one modification of this invention, represented in Figs. 6, 7, 8, and 9, the socket E is a separate piece, fitting between upper and lower bearings $h\ h'$ and against a rear middle bearing, $g$, on the stock B, and two headed screws, $f\ f'$, extend through holes through the stock and screw into the socket-piece E on opposite sides of the bearing $g$, so that by properly turning and adjusting the screws $f\ f'$ the socket-piece will be adjusted so that the axis D therein will be at right angles to the plane of sight of the sight-vanes of the compass, to which the attachment is secured, provided the axis D shall be first adjusted, as by means of the screw $j$, Fig. 9, at right angles to the sight-line $o\ o$ of the vane to which the stock B is attached.

When the supporting-axis D is thus adjusted at right angles to the plane of sight of the two sight-vanes C C' on the compass, and the optical axis of the telescope is adjusted in a plane at right angles to the axis D by means of the ordinary adjustable cross-wires in the telescope, the latter is then in adjustment, so as to turn about the axis D in a plane essentially parallel to the plane of sight of the two sight-vanes, and the whole telescopic attachment is then in proper adjustment for use on the compass in surveying, and can be quickly removed from the compass for convenient packing and transportation, and resecured thereon in full adjustment at the same place on the sight-vane by means of the clamp-screws $u\ q$, a mark being made on the sight-vane to indicate the place for the upper end of the attachment.

We generally prefer to slip the stock B over the south sight-vane of the compass, with the telescope at the right hand and the clamp-screw $u$ on the outer side, as shown in Fig. 1, and place the stock B as low down as will allow the telescope to revolve in either direction without striking the compass, and then just hold the stock in place by the clamp-screw $u$ and tighten the screw $q$ until the bearings $t\ s$ are firm against the edge $r$ of the sight-vane, and then tighten the screw $u$ to finish the fastening.

The method or process of adjusting the optical axis of the telescope in a plane at right angles to the supporting-axis D by means of the ordinary adjustable cross-wires in the telescope, and of adjusting the supporting-axis at right angles to the plane of sight of the sight-vanes on the compass or plane-table by means of the adjusting devices above described, so that the telescope shall turn with its optical axis in a plane essentially parallel to the plane of sight of the sight-vanes, will be readily perceived by competent surveyors and manufacturers of surveying-instruments without further description.

When the adjustments are thus completed, the whole attachment can be removed from the sight-vane and resecured thereon in complete adjustment in a moment, without danger of deranging any of the parts.

With this telescopic attachment on a surveyor's compass or plane-table much longer sights, either fore or back, can be taken through the telescope, and lines run up and down steep hill-sides with the same facility as on level ground, and all with more accuracy, and with great relief to the eyes of the surveyor, while the sight-vanes are always ready for instant use, as may be desirable in dusky places, and in first directing the telescope toward objects to be sighted, and in detecting any accidental disadjustment of the telescopic attachment. Indeed, every surveyor's compass having common sight-vanes can, by this simple, cheap, and light attachment, be transformed at will into a transit-compass with sight-vanes in addition, all ready for instant use.

What we claim as our invention is—

1. A telescope having a supporting-axis and clamping attachment, substantially as described, whereby the telescope can be secured upon one of the sight-vanes on a surveyor's compass so as to turn on the supporting-axis in a plane essentially parallel to the plane of sight of the sight-vanes.

2. A telescope having a supporting-axis and clamping attachment furnished with adjusting devices, substantially as described, whereby the telescope can be secured upon either of several sight-vanes of somewhat different shape or inclination of surface on different compasses, and adjusted thereon to turn upon the said supporting-axis, with the optical axis of the telescope in a plane essentially parallel to the plane of sight of the sight-vanes.

In testimony whereof we have hereunto set our hands in the presence of two subscribing witnesses this 15th day of June, 1878.

WILLIAM GURLEY.
LEWIS E. GURLEY.

Witnesses:
PAUL COOK,
F. C. A. JONES.